Patented Nov. 6, 1951

2,574,390

UNITED STATES PATENT OFFICE 2,574,390

PRODUCTION OF ALKENYLHALOSILANES

David B. Hatcher, Toledo, Ohio, assignor to Libbey-Owens-Ford Glass Company, Toledo, Ohio, a corporation of Ohio No Drawing. Application March 27, 1948,
Serial No. 17,571

9 Claims. (Cl. 260—448.2)

Alkenylhalosilanes, if they could be produced commercially, would be valuable as intermediates for the production of synthetic resins. However, the methods heretofore known for producing alkenylhalosilanes have been too expensive for ordinary commercial use. Vinylchlorosilanes or allylchlorosilanes can be produced by the reaction of vinyl chloride or allyl chloride with copper-silicon alloy, but the yields from such a reaction are very low. Vinyltrichlorosilane has been prepared also by reaction of quinoline with a mixture of alpha-chloroethyltrichlorosilane and beta-chloroethyltrichlorosilane, but that reaction also is expensive because it requires the use of quinoline.

The principal object of the invention is to provide a novel method of producing alkenylhalosilanes that is inexpensive and commercially feasible. More specific objects and advantages are apparent from the description, which merely discloses and illustrates the invention and is not intended to impose limitations upon the claims.

The fact that in the reaction of quinoline with a mixture of chloroethyltrichlorosilanes, silicon tetrachloride was produced indicated that the chloroethyltrichlorosilanes had a tendency to decompose into silicon tetrachloride and ethylene. The present invention is based upon the discovery that on the contrary the pyrolysis of haloalkylhalosilanes under the conditions hereinafter described gives substantial yields of alkenylhalosilanes. In the production of alkenylhalosilanes by this novel method, a hydrogen halide is formed and can be recovered directly as a valuable byproduct. In contrast, the reaction of quinoline with chloroethyltrichlorosilanes produces quinoline hydrochloride as a byproduct. The recovery of quinoline from quinoline hydrochloride is expensive, and involves the production of sodium chloride or calcium chloride as a waste product so that the hydrogen chloride is lost.

The present invention consists in a method of producing alkenylhalosilanes that comprises pyrolyzing a silane whose molecule consists of a silicon atom to which are attached four radicals not more than two of which are unsubstituted saturated monovalent hydrocarbon radicals, from one to three of which are halogens each having an atomic weight less than 100, and from one to two of which are monovalent radicals each consisting of a halo-substituted saturated hydrocarbon chain having from one to two substituents each consisting of a halogen having an atomic weight between 20 and 100, and having at least one hydrogen atom which is attached to a carbon atom adjacent to a halo-substituted carbon atom.

In the practice of the invention one of the silanes defined in the preceding paragraph may be vaporized in suitable equipment and then conducted to a heated reaction zone where pyrolysis occurs. An inert gas may be passed through the equipment to serve as a carrier for the silanes, but this is not essential. Before pyrolysis is started it is desirable that the equipment be flushed with a heated inert gas in order to remove any substance with which any of the silanes would react. The vaporous silanes that are discharged from the reaction zone may be condensed in a train of condensers consisting of a water-cooled condenser followed by a number of Dry Ice traps sufficient to reduce all the vapor to the liquid phase. Any hydrogen halide produced by the pyrolysis is collected in a water scrubber which follows the last Dry Ice trap. The liquid collected in the different traps may be combined and the various constituents separated by fractional distillation through a packed column.

The molecule of the silanes that are pyrolyzed in the practice of this invention, hereinafter called silane reactants, consists of a silicon atom to which are attached four radicals, as follows:

A. One or two of these radicals may be an unsubstituted, saturated, monovalent hydrocarbon radical having as many as 32 carbon atoms (i. e., methyl, ethyl, propyl, isopropyl, n-butyl, isobutyl, secondary butyl, a straight- or branched-chain primary or secondary alkyl radical having from 5 to 32 carbon atoms, or a cycloalkyl radical that is substituted or unsubstituted, all substitutions, if any, being primary, secondary or tertiary alkyl radicals, and the total number of carbon atoms, in the ring and side chains, being not more than 32. Cyclopentyl, cyclohexyl and alkyl-substituted cyclopentyl and cyclohexyl are the most common examples of such radicals, but rarer radicals can be used, including those having two or more rings). Preferred silane starting materials have not more than one such radical.

B. From one to three of these radicals are halo radicals having an atomic weight less than 100 (i. e., fluoro, chloro or bromo radicals). The preferred halo radical is the chloro radical, and the most desirable starting materials are trichlorosilanes having, attached to the silicon atom in the silane molecule, one monohalo-substituted saturated hydrocarbon chain (as hereinafter described).

C. From one to two of these radicals are saturated mono- or dihalo-substituted primary or secondary monovalent hydrocarbon chains, the chains being straight or branched or closed, and having not more than 32 carbon atoms, at least one hydrogen atom being attached to a carbon atom adjacent to a halo-substituted carbon atom, and each halo substituent being a chloro or bromo radical. Examples of such radicals include mono- or di-chloro- or bromo-substituted ethyl, propyl, isopropyl, n-butyl, isobutyl and secondary butyl; mono- or di- chloro- or bromo-substituted primary or secondary alkyl radicals having straight or branched chains consisting of from 5 to 32 carbon atoms; and mono- or di- chloro- or bromo-substituted cycloalkyl radicals having not more than 32 carbon atoms, any substituents other than chloro or bromo radicals being primary, secondary or tertiary alkyl radicals. Mono- and di- chloro- or bromo-substituted cyclopentyl and cyclohexyl or alkyl-substituted cyclopentyl and cyclohexyl are the most common examples of such radicals, but other mono- or di- chloro- or bromo-substituted cycloalkyl radicals can be used, including those having two or more rings. A preferred embodiment of the invention involves pyrolysis of silanes having only one such halo-substituted saturated hydrocarbon radical. The preferred radical is a mono- chloro-substituted radical.

Examples of such silanes include alpha-chloro-ethyltrichlorosilane, beta - chloroethyltrichlorosilane, alpha-chloropropyltrichlorosilane, beta-chloropropyltrichlorosilane, gamma - chloropropyltrichlorosilane, chlorocyclohexyltrichlorosilanes, alpha-chloroethylethyldichlorosilane, beta-chloroethylethyldichlorosilane, monochloro - n - butyltrichlorosilanes, 1-1 dichloroethyltrichlorosilane, and 1-2 dichloroethyltrichlorosilane.

Silane reactants may be prepared by reaction between sulfuryl chloride or bromide and a silane having the general formula

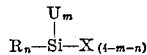

wherein $m$ is a number from 0 to 2; $n$ is an integer from 1 to 2; $(m+n)$ is from 1 to 3; X is a halo radical having an atomic weight less than 100; R is an unsubstituted saturated hydrocarbon chain, the chain being straight, branched or closed, having not more than 32 carbon atoms; and U is an unsubstituted saturated monovalent hydrocarbon radical having not more than 32 carbon atoms. Such a reaction results in mono-chlorination or mono-bromination of the hydrocarbon chain. Further halo substitution is achieved by reacting the mono-chlorinated or -brominated silane with sulfuryl chloride or sulfuryl bromide. This second chlorination or bromination produces silane wherein the second bromo or chloro radical is attached to the hydrocarbon chain to which is attached the first chloro or bromo radical as well as those wherein the second bromo or chloro radical is attached to a different chain. By suitable repetition of this reaction any desired silane reactant may be prepared. The products of each chlorination or bromination are separated by fractional distillation. In order to demonstrate the procedure by which such a chlorination or bromination is conducted the following method is described:

Sulfuryl chloride (432 grams) and n-propyl-trichlorosilane (534 grams) are mixed and added to a one liter flask which is fitted with a reflux condenser equipped with a calcium chloride drying tube. Benzoyl peroxide (2 grams) is added to the flask which is then heated on a steam bath and maintained in gentle reflux for about 16 hours. During this refluxing sulfur dioxide and hydrogen chloride are evolved. The liquid remaining in the flask after the refluxing is cooled, and is separated into its component parts by fractional distillation through a glass column (about 18 mm. in diameter and 18 inches long) packed with glass helices. This fractionation yields 183 grams of beta-chloropropyltrichlorosilane and 98 grams of gamma-chloropropyltrichlorosilane in addition to a small amount of alpha-chloropropyltrichlorosilane.

As hereinbefore described analogous results are achieved by the use of sulfuryl bromide, and a second chloro or bromo radical can be substituted for hydrogen by repeating the reaction between sulfuryl chloride or sulfuryl bromide and one of the products of the first chlorination or bromination (e. g., alpha - chloropropyltrichlorosilane, beta-chloropropyltrichlorosilane or gamma-chloropropyltrichlorosilane). Thus, by suitable chlorination and bromination reactions it is possible to prepare any of the silane reactants hereinbefore described.

Examples of the silanes that may be chlorinated or brominated to produce silane reactants include ethyltrifluorosilane, diethyldifluorosilane, triethylfluorosilane, n-propyltrifluorosilane, tri-n-propylfluorosilane, isopropyltrifluorosilane, n-butyltrifluorosilane, di-n-butyldifluorosilane, tri-n-butylfluorosilane, n-pentyltrifluorosilane, di-n-pentyldifluorosilane, tri - n - pentylfluorosilane, ethyldifluorochlorosilane, ethylfluorodichlorosilane, n-propyldifluorochlorosilane, n-propylfluorodichlorosilane, isopropyldifluorochlorosilane, isopropylfluorodichlorosilane, n - butyldifluoro - chlorosilane, n-butylfluorodichlorosilane, ethyltrichlorosilane, diethyldichlorosilane, triethylchlorosilane, ethyl-n-propyldichlorosilane, ethyl-isobutyldichlorosilane, n - propyltrichlorosilane, di-n-propyldichlorosilane, isopropyltrichlorosilane, n-butyltrichlorosilane, isobutyltrichlorosilane, n-pentyltrichlorosilane, isopentyltrichlorosilane, n-hexyltrichlorosilane, hexyltrichlorosilanes, dihexyldichlorosilanes, n-octyltrichlorosilane, n-decyltrichlorosilane, n-dodecyltrichlorosilane, n-tetradecyltrichlorosilane, triethylbromosilane, tri-n-propylbromosilane, tri-isobutylbromosilane, cyclohexyltrichlorosilane and tri-isopentylbromosilane.

The minimum temperature at which it is practical to conduct the reaction of the invention is dependent to a considerable extent upon the identity of the silane to be pyrolyzed. This temperature is different when the carbon atom to which the halogen is bonded is a primary carbon atom than when this carbon atom is secondary or tertiary. It also differs with differences in the location of the halogen atom with respect to the silicon atom. Further, the temperature is different when the halo radical is chloro than when it is bromo. In some instances pyrolysis may occur at temperatures as low as about 375° C. However, it is usually preferable to conduct the pyrolysis at temperatures not lower than about 425° C. and, most desirably, the reaction is conducted at temperatures not lower than about 475° C. The maximum temperature at which it is practical to conduct the reaction of the invention is the temperature above which undesired decomposition occurs, or above which increased heat input is not useful because it does not produce larger yields of alkenylhalosilanes. In most instances it is not practical to conduct the reaction of the invention at temperatures more than about 750° C. and it is preferable that the reaction be conducted at temperatures not more than about 700° C. Most desirably the reaction is conducted at temperatures not more than about 650° C.

Conducting the present reaction at elevated pressure may tend to reduce the yield. Consequently, the less expensive method of conducting the reaction at approximately atmospheric pressure is ordinarily adopted.

It is sometimes desirable to vaporize the silane to be pyrolyzed in the presence of an inert gas which serves as a carrier for the silane. Alkenylhalosilanes produced by the reaction of the invention that have hydrocarbon chains with ethylenic unsaturation are subject to addition polymerization. Besides serving as a carrier the inert gas acts also as a diluent and decreases the tendency toward addition polymerization through these radicals. Nitrogen, hydrogen, helium, neon, argon or krypton can be used as the inert gas carrier and diluent, although, in some instances hydrogen may be undesirable because it tends to hydrogenate the alkenylhalosilanes.

The pyrolysis reaction proceeds at a relatively rapid rate so that comparatively large amounts of alkenylhalosilanes can be produced by continuous operation of small equipment. There is usually no practical reason for using a contact time of more than about 5 minutes. ("Contact time" is used herein to mean the average time required for a quantity of reactant equal to the volume of the reaction zone, calculated at reaction temperature and pressure, to pass into the reactor.) Usually it is preferable to use contact times not longer than about 2 minutes, and most desirable to use contact times not longer than about one minute in the practice of the invention. It is usually desirable to use contact times not shorter than about 1 second, although in some instances it is possible to use contact times as low as about ¼ second. It is ordinarily preferable to use contact times not shorter than about 2 seconds. Most desirably the reaction of the invention is conducted using contact times not shorter than about 5 seconds.

Example 1

A beta-haloalkyltrihalosilane, e. g., beta-chloroethyltrichlorosilane, is pyrolyzed to produce an alkenylchlorosilane, e. g., vinyltrichlorosilane, according to the following procedure:

Dry hydrogen is passed through a vaporizing flask (heated to about 200° C.) and from thence through an unglazed porcelain tube having an internal diameter of about ⅞ inch; this tube is packed with pieces of unglazed porcelain which are approximately ½" x ½" x ⅛". The volume of the tube when so packed is about 100 ml. in addition to the packing. The hydrogen flow is maintained for a period of time sufficient to dry the apparatus. When the apparatus is dry (after it has been flushed with hydrogen for about 10 minutes) the rate of flow of hydrogen through the apparatus is adjusted to about 50 ml. per minute measured at 25° C. and atmospheric pressure. While the reaction is proceeding, the reaction tube is held at a temperature between about 500° C. and about 525° C. in an electric combustion furnace. The silane (beta-chloroethyltrichlorosilane) is added dropwise (at a rate of about 0.005 mol of silane reactant per minute) to the flask which is maintained at a sufficiently high temperature that the silane is vaporized in the flask. Hydrogen flow through the flask and reactor is continued at about the same rate (i. e., 50 ml. per minute measured at 25° C. and atmospheric pressure) throughout the reaction, the hydrogen serving as an inert gas carrier for the silanes. At this flow rate the contact time is about 13 seconds. The reaction products are collected in a water cooled condenser; further product is collected in two Dry Ice traps; and the hydrogen halide formed by the reaction is removed from the hydrogen stream in a water scrubber. After the reaction has been conducted for about 95 minutes (and about 93 grams of beta-chloroethyltrichlorosilane have been added to the vaporizer) the total liquid recovered consists of about 68 grams. Fractional distillation of this liquid through a 20 inch glass column, 18 mm. in diameter and packed with glass helices yields 7 grams of vinyltrichlorosilane, 21 grams of silicon tetrachloride, 32 grams of beta-chloroethyltrichlorosilane and 3 grams of residue. This corresponds to a 9.2 per cent conversion of the beta-chloroethyltrichlorosilane charged to vinyltrichlorosilane and a 26.3 per cent conversion to silicon tetrachloride. By titration it is determined that the hydrogen chloride collected in the water scrubber amounts to 5.38 grams. It is possible that a small part of the hydrogen halide detected in the scrubbing water is derived from the hydrolysis of halosilanes not condensed in the water or Dry Ice traps. It is believed, however, that the amount of a hydrogen halide detected in the scrubbing water is a reasonably accurate measure of the amount of dehydrohalogenation.

A mixture of chlorovinyltrichlorosilanes is obtained by carrying out the procedure of the preceding paragraph using, instead of the beta-chloroethyltrichlorosilane, a mixture of about equal parts by weight of 1-1 dichloroethyltrichlorosilane and 1-2 dichloroethyltrichlorosilane.

Because only a comparatively short pyrolysis reaction is conducted according to the procedure of this and the subsequent examples, the percentage losses of products in the reaction zone, in the vaporizer and condensers, and in the distillation equipment are materially greater than when the reaction is run on a commercial basis for considerably longer periods of time. Consequently, the reported conversions to alkenylhalosilanes are substantially less than can be expected under operating conditions.

Analogous results are obtained by conducting the reaction of this and the succeeding examples using a bromo or fluorosilane instead of the chlorosilane, or a silane whose molecule includes, attached to the silicon atom, a bromo-substituted instead of a chloro-substituted saturated straight, branched or closed chain hydrocarbon radical.

Example 2

An alpha-haloalkyltrihalosilane, e. g., alpha-chloroethyltrichlorosilane, is pyrolyzed to produce an alkenylchlorosilane, e. g., vinyltrichlorosilane, according to a procedure that is the same as that described in the first paragraph of Example 1 except that the reaction tube is held at a temperature between about 500° C. and about 530° C.; the alpha-haloalkyltrihalosilane is added dropwise to the flask at a rate of about 0.006 mol of silane per minute; and the contact time is about 12 seconds. After the reaction has been conducted for about 70 minutes (and about 76 grams of alpha-haloalkyltrihalosilane have been added to the vaporizer) the total liquid recovered consists of about 69 grams. Fractional distillation of this liquid yields 10 grams of vinyltrichlorosilane, 3 grams of silicon tetrachloride, 50 grams of alpha-chloroethyltrichlorosilane and 3 grams of residue. This corresponds to a 16.1 per cent conversion of the alpha-chloroethyltrichlorosilane charged to vinyltrichlorosilane.

Example 3

A gamma-haloalkyltrihalosilane, e. g., gamma-chloropropyltrichlorosilane, is pyrolyzed to produce an alkenylchlorosilane, e. g., a propenyltrichlorosilane, according to a procedure that is the same as that described in the first paragraph of Example 1 except that the reaction tube is held at a temperature of about 520° C.; and the contact time is about 13 seconds. After the reaction has been conducted for about 95 minutes (and about 98 grams of gamma-chloropropyltrichlorosilane have been added to the vaporizer), the total liquid recovered consists of about 82 grams. Fractional distillation of this liquid yields 11 grams of a propenyltrichlorosilane, 5 grams of silicon tetrachloride, 55 grams of gamma-chloropropyltrichlorosilane and 6 grams of residue. This corresponds to a 13.5 per cent conversion of the gamma-chloropropyltrichlorosilane charged to a propenyltrichlorosilane.

Example 4

A mixture of alpha- and beta-haloalkyltrihalosilanes, e. g., alpha-chloropropyltrichlorosilane and beta-chloropropyltrichlorosilane, is pyrolyzed to produce one or more alkenylsilanes, e. g., propenyltrichlorosilanes, according to a procedure that is the same as that described in the first paragraph of Example 1 except that the reaction tube is held at a temperature between about 500° C. and about 520° C. and the mixture of silanes is added dropwise to the flask at a rate of about 0.006 mol of silane per minute. After the reaction has been conducted for about 90 minutes (and about 116 grams of mixed alpha- and beta-chloropropyltrichlorosilanes have been added to the vaporizer), the total liquid recovered consists of about 87 grams. Fractional distillation of this liquid yields 7 grams of a material which consists substantially of a propenyltrichlorosilane, 14 grams of a material which consists substantially of a propyltrichlorosilane, 35 grams of silicon tetrachloride, 18 grams of mixed alpha- and beta-chloropropyltrichlorosilanes and 3 grams of residue. This corresponds to a 7.3 per cent conversion of the alpha- and beta-chloropropyltrichlorosilanes charged to the propenyltrichlorosilane.

Example 5

Halocycloalkyltrihalosilanes, e. g., chlorocyclohexyltrichlorosilanes, are pyrolyzed to produce cycloalkenylhalosilanes, e. g., cyclohexenyltrichlorosilanes, according to a procedure that is the same as that described in the first paragraph of Example 1 except that the reaction tube is held at a temperature of about 510° C.; the halocyclohexyltrihalosilanes are added dropwise to the flask at a rate of about 0.013 mol of silanes per minute; and the reaction time is about 6 seconds. After the reaction has been conducted for about 40 minutes (and about 135 grams of the chlorocyclohexyltrichlorosilanes have been added to the vaporizer) the total liquid recovered consists of about 105 grams. Fractional distillation of this liquid yields 20 grams of cyclohexenyltrichlorosilanes, 7 grams of a mixture of silicon tetrachloride and cyclohexene and 55 grams of residue which consists substantially of the unpyrolyzed chlorocyclohexyltrichlorosilanes. This corresponds to a 17.4 per cent conversion of the chlorocyclohexyltrichlorosilanes charged to cyclohexenyltrichlorosilanes.

Example 6

A beta-haloalkylalkyldichlorosilane, e. g., beta-chloroethylethyldichlorosilane, is pyrolyzed to produce an alkenylhalosilane, e. g., ethylvinyldichlorosilane, according to the following procedure: Dry nitrogen is passed through a small glass coil (heated to about 200° C.), which serves as a vaporizer, and from thence through a Pyrex-glass tube having an internal diameter of about ⅞ inch; this tube is packed with pieces of unglazed porcelain which are approximately ½" x ½" x ⅛". The volume of the tube when so packed is about 65 ml. in addition to the packing. The nitrogen flow is maintained for a period of time sufficient to dry the apparatus. When the apparatus is dry (after it has been flushed with nitrogen for about 10 minutes) the rate of flow of nitrogen through the apparatus is adjusted to about 72 ml. per minute measured at 25° C. and atmospheric pressure. The reaction tube is heated to about 475° C. in an electric combustion furnace. The silane (beta-chloroethylethyldichlorosilane) is dropped at a rate of about 0.007 mol of silane reactant per minute into the glass preheating coil which is maintained at a sufficiently high temperature that the silane is vaporized in the coil. Nitrogen flow through the preheating coil and reactor is continued at about the same rate (i. e., 72 ml. per minute measured at 25° C. and atmospheric pressure) throughout the reaction, the nitrogen serving as an inert gas carrier for the silanes. The contact time is about 6 seconds. The vapors from the reaction tube are condensed in a water-cooled condenser; further vapors are condensed in two Dry Ice traps; and the hydrogen halide formed by the reaction is removed from the nitrogen carrier in a water scrubber. After the reaction has been conducted for about 75 minutes (and about 99 grams of the beta-haloalkylalkyldichlorosilane have been added to the vaporizer), the total liquid recovered consists of about 90 grams. Fractional distillation of this liquid through a 20-inch glass column 18 mm. in diameter and packed with glass helices yields a small amount of ethylvinyldichlorosilane, the main product being ethyltrichlorosilane.

The procedure of the preceding paragraph is repeated using, instead of the beta-chloroethylethyldichlorosilane, alpha - chloroethylethyldichlorosilane, except that the alpha-chloroethylethyldichlorosilane is dropped at a rate of about 0.004 mol per minute into the glass preheating coil, and the contact time is about 9 seconds. After the reaction has been conducted for about 120 minutes (and about 83 grams of alpha-chloroethylethyldichlorosilane have been added to the vaporizer) the total liquid recovered consists of about 72 grams. Fractional distillation of the liquid yields 13 grams of ethylvinyldichlorosilane, 9.5 grams of ethyltrichlorosilane, 41.5 grams of alpha-chloroethylethyldichlorosilane and 3 grams of residue. This corresponds to a 19.4 per cent conversion of the alpha-chloroethylethyldichlorosilane charged to ethylvinyldichlorosilane.

Example 7

The procedure of the first paragraph of Example 6 is repeated using, instead of the beta-chloroethylethyldichlorosilane, beta - chloroethyltrichlorosilane. In order to determine the minimum temperature at which it is practical to conduct the dehydrohalogenation, the Pyrex-glass tube is held at a temperature between about 360° C. and about 375° C.; the silane is added dropwise to the preheating coil at a rate of about 0.005 mol per minute; and the contact time is about 15 seconds. After the reaction has been conducted for about 80 minutes (and about 78 grams of beta-chloroethyltrichlorosilane have been added to the vaporizer) the total liquid recovered consists of about 73 grams. By titration it is determined that the hydrogen chloride collected in the water scrubber amounts to 0.29 gram.

The procedure of the preceding paragraph is repeated except that no nitrogen carrier is used; the Pyrex glass reaction tube is held at a temperature between about 425° C. and about 435° C.; the silane is added dropwise to the vaporizing coil at a rate of about 0.002 mol per minute; and the contact time is about 37 seconds. After the reaction has been conducted for about 202 minutes (and about 73 grams of beta-chloroethyltrichlorosilane have been added to the vaporizer) the system is flushed with nitrogen for about 10 minutes. The total liquid recovered consists of about 67 grams. It is determined by titration that the hydrogen chloride collected in the water scrubber amounts to 0.4 gram.

*Example 8*

The procedure of the first paragraph of Example 6 is repeated using, instead of the beta-chloroethylethyldichlorosilane, a mono-chloro-n-butyltrichlorosilane (boiling temperature 104° C. at an absolute pressure of 25 mm. of mercury). In order to determine whether or not the minimum temperature at which it is practical to conduct the dehydrohalogenation is the same for all starting materials, the reaction tube is held at a temperature between about 425° C. and about 430° C.; the silane is added dropwise to the reactor at a rate of about 0.003 mol per minute; the contact time is about 27 seconds; and no nitrogen carrier is used. After the reaction has been conducted for about 132 minutes (and about 76 grams of the mono-chloro-n-butyltrichlorosilane have been added to the vaporizer) the system is flushed with nitrogen for about 10 minutes. The total liquid recovered amounts to about 62½ grams and consists substantially of unreacted starting material. Lower boiling unsaturated materials amounting to about 3½ grams are also recovered. It is determined by titration that the hydrogen chloride collected in the water scrubber amounts to 1.27 grams.

The procedure of the preceding paragraph is repeated except that the reaction tube is held at a temperature between about 447° C. and about 452° C. and the contact time is about 22 seconds. After the reaction has been conducted for about 87 minutes (and about 61 grams of the mono-chloro-n-butyltrichlorosilane have been added to the vaporizer) the total liquid recovered consists of about 57½ grams. It is determined by titration that the hydrogen chloride collected in the water scrubber amounts to 0.82 gram.

The procedure of the first paragraph of the example is repeated except that the reaction tube is held at a temperature between about 502° C. and about 511° C.; the mono-chloro-n-butyltrichlorosilane is added dropwise to the flask at a rate of about 0.004 mol of silane per minute; and the contact time is about 12 seconds. After the reaction has been conducted for about 71 minutes (and about 57½ grams of the mono-chlorinated n-butyl-trichlorosilane have been added to the vaporizer) the total liquid recovered consists of about 53½ grams. Fractional distillation of this liquid yields 5 grams of a butenyltrichlorosilane, 34 grams of the mono-chloro-n-butyltrichlorosilane, 8 grams of intermediates and 6.5 grams of residue. This corresponds to a 13.8 per cent conversion of the mono-chloro-n-butyltrichlorosilane charged to a butenyltrichlorosilane. It is determined by titration that the hydrogen chloride collected in the water scrubber consists of 1.37 grams.

*Example 9*

The procedure of the first paragraph of Example 6 is repeated using, instead of the beta-chloroethylethyldichlorosilane, mono-chloro-n-butyltrichlorosilanes (34.1 grams having a boiling temperature of 104° C. at an absolute pressure of 25 mm. of mercury and 60 grams having a boiling temperature of 88° C. at an absolute pressure of 25 mm. of mercury), except that the reaction tube is held at a temperature between about 606° C. and about 620° C.; the silane is added dropwise to the reactor at a rate of about 0.003 mol per minute; the contact time is about fifteen seconds; and no nitrogen carrier is used. After the reaction has been conducted for about 125 minutes (and the 94.1 grams of mono-chloro-n-butyltrichlorosilanes have been added to the vaporizer) the system is flushed with nitrogen for about ten minutes. The total liquid recovered amounts to about 78 grams. Fractional distillation of this liquid yields 30 grams of butenyltrichlorosilanes, 6.4 grams of silicon tetrachloride, 27.7 grams of unreacted mono-chloro-n-butyltrichlorosilanes, 8.1 grams of intermediates and 4 grams of residue. This corresponds to a 46.0 per cent conversion of the mono-chloro-n-butyltrichlorosilanes charged to butenyltrichlorosilanes. It is determined by titration that the hydrogen chloride collected in the water scrubber consists of 3.74 grams.

Having described the invention, I claim:

1. A method of producing alkenylhalosilanes that comprises pyrolyzing, in the vapor phase at a temperature of a least 360° C., a silane whose molecule consists of a silicon atom to which are attached four radicals not more than two of which are unsubstituted saturated conovalent hydrocarbon radicals, from one to three of which are halogens each having an atomic weight less than 100, and from one to two of which are monovalent radicals each consisting of a halo-substituted saturated hydrocarbon chain having from one to two substituents each consisting of a halogen having an atomic weight between 20 and 100, and having at least one hydrogen atom which is attached to a carbon atom adjacent to a halo-substituted carbon atom.

2. A method as claimed in claim 1 in which not more than one of the radicals attached to the silicon atom is an unsubstituted hydrocarbon radical.

3. A method as claimed in claim 2 in which only one of the radicals attached to the silicon atom is a halo-substituted hydrocarbon chain.

4. A method of producing alkenylhalosilanes that comprises pyrolyzing, in the vapor phase at a temperature of at least 360° C., a silane having the general formula

wherein $w$ is a monovalent radical consisting of a mono-halo-substituted saturated hydrocarbon chain having at least one hydrogen atom which is attached to a carbon atom adjacent to the halo-substituted carbon atom, the halogen substituent having an atomic weight between 20 and 100; $r$ is an unsubstituted saturated monovalent hydrocarbon radical; and $n$ is an integer from 2 to 3.

5. A method of producing alkenylhalosilanes that comprises pyrolyzing, in the vapor phase at a temperature of at least 360° C., a silane having the general formula

$wSiCl_3$ wherein $w$ is a monovalent radical consisting of a mono-halo-substituted saturated hydrocarbon chain having at least one hydrogen atom which is attached to a carbon atom adjacent to the halo-substituted carbon atom, the halogen substituent having an atomic weight between 20 and 100.

6. A method as claimed in claim 5 in which the halogen substituent on the hydrocarbon chain is chlorine.

7. A method of producing alkenylhalosilanes that comprises pyrolyzing, in the vapor phase at a temperature of at least 360° C., gamma-chloropropyltrichlorosilane.

8. A method of producing alkenylhalosilanes that comprises pyrolyzing, in the vapor phase at a temperature of at least 360° C., alpha-chloroethyltrichlorsilane.

9. A cyclohexenyltrichlorosilane obtained by pyrolyzing, in the vapor phase at a temperature of at least 360° C., a halocyclohexyltrichlorosilane in which the halogen substituent has an atomic weight between 20 and 100.

DAVID B. HATCHER.

REFERENCES CITED

The following references are of record in the file of this patent:

UNITED STATES PATENTS

| Number | Name | Date |
|---|---|---|
| 2,420,912 | Hurd | May 20, 1947 |

OTHER REFERENCES

Sommer et al., "Jour. Am. Chem. Soc.," vol. 68 (1946), pages 485–487.

Sommer et al., "Jour. Am. Chem. Soc.," vol. 68 (1946), pages 1083–1085.

Hurd., "Jour. Am. Chem. Soc.," vol. 67 (1945), pages 1813–1814.